(No Model.)
F. B. RAE.
ARMATURE FOR DYNAMO ELECTRIC MACHINES AND MOTORS.
No. 437,663. Patented Sept. 30, 1890.
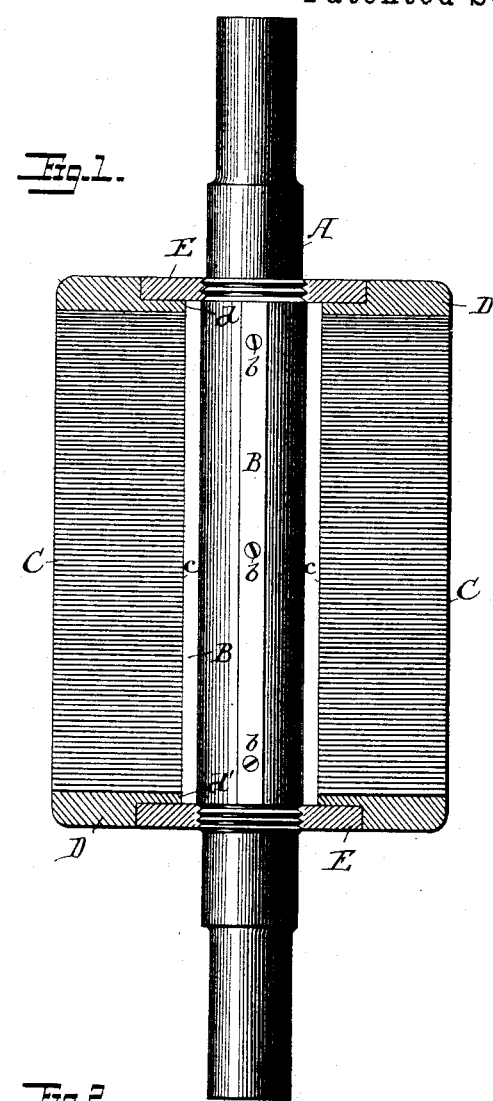
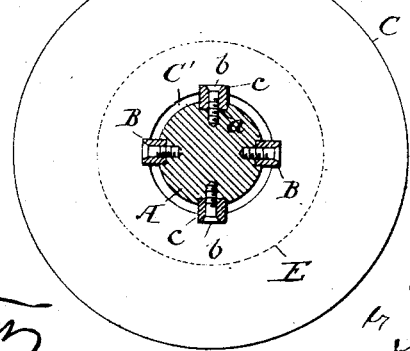
WITNESSES
INVENTOR

UNITED STATES PATENT OFFICE.

FRANK B. RAE, OF DETROIT, MICHIGAN, ASSIGNOR TO THE DETROIT ELECTRICAL WORKS, OF SAME PLACE.

ARMATURE FOR DYNAMO-ELECTRIC MACHINES AND MOTORS.

SPECIFICATION forming part of Letters Patent No. 437,663, dated September 30, 1890.

Application filed July 15, 1890. Serial No. 358,824. (No model.)

*To all whom it may concern:*

Be it known that I, FRANK B. RAE, a citizen of the United States, residing at Detroit, Wayne county, Michigan, have invented certain new and useful Improvements in Armatures for Dynamo Machines and Motors, of which the following is a specification.

My invention is an armature for dynamo-electric machines or motors, in which are embodied simplicity of construction and solidity and compactness of structure, and from which improved electrical results are obtained.

In order to give a better understanding of my invention reference is made to the accompanying drawings, in which—

Figure 1 is a longitudinal section of the armature-core and its shaft, and Fig. 2 is a transverse section of the same.

In the construction of armatures, especially those used for electric motors, as on electric railways and the like, it is desirable to make as simple, cheap, and compact an armature as possible, and one that is not subject to derangement from exposure to the elements and constant strain in operating, and among many improvements it has been common to make the armature-core of plates of sheet metal, stamped or otherwise formed and mounted and secured on the shaft and covered with the necessary amount of wire.

My invention relates more particularly to an improved method of uniting the core and shaft, especially when said core is made up of a number of disks of metal.

Referring to the drawings, A represents an armature-shaft, the central portion of which, included in the core of the armature, is grooved, as at $a$, to a depth of perhaps a quarter of an inch or more, depending upon the diameter of the armature, and in these grooves are secured brass bars or splines B. In the drawings I have shown four of these, which I have generally found sufficient, and they are shown as being secured by screws $b$. These splines or bars extend above the circumference of the shaft a short distance and serve to support the plates C of the armature-core. These plates, which may be stamped or otherwise formed, are provided with a central opening C' and the recesses or notches $c$, fitting on the splines B. The plates C are securely held in position on the shaft by the end plates D, which are preferably of brass or other non-magnetic material, between which they are clamped, they being held together by the nuts E, fitting recesses in the end plates and secured upon the shaft by screw-threads or otherwise. Thus in constructing the armature one of the end plates D is fitted upon the shaft, and being provided with recesses $d$, which fit the spline, it is held securely against circumferential movement, and the nut E is screwed up to hold the plate in position, so that it cannot move in the direction of the length of the shaft. The laminated plates are then slipped over the shaft, the notches therein fitting the same, and a sufficient number are strung or mounted upon the shaft to fill the space intended to receive them. The other end plate D is then fitted on the shaft, the notches $d'$ passing over the splines, and the nut E is then screwed up tightly into the recess in the end plate D. These end pieces entirely close the space around the shaft between the disks and the shaft and the splines. It will thus be seen that the disks are tightly clamped together and are so mounted on the splines, which in turn are rigidly connected to the shaft, that they are prevented from circumferential movement, and in this way there is no danger of the armature-core moving around the shaft under the magnetic stress exerted when the armature is rotating. Furthermore, the splines being of non-magnetic material, as brass, they magnetically insulate the disks, forming the core from the shaft. This whole structure forms a compact rigid core, which is simple in arrangement, and at the same time has advantages due to the use of laminated plates.

Having thus described my invention, what I claim is—

1. An armature consisting of a shaft having recesses in which are secured the non-magnetic splines, disks having notches fitting said splines, end plates, also having notches, fitting the splines, and nuts mounted on the shaft and fitting recesses in the end plates, substantially as described.

2. An armature consisting of a shaft having longitudinal recesses, splines of non-conducting material secured in said recesses, disks of magnetic material mounted on the splines, end plates of non-magnetic material, also mounted on the splines, and nuts screwed upon the shaft and fitting recesses in the end plates, substantially as described.

In testimony whereof I have signed my name to this specification in the presence of two subscribing witnesses.

FRANK B. RAE.

Witnesses:
JAMES WHITTEMORE,
N. L. LINDOP.